3,168,732
DEVICE IN SEARCHING AND TRACKING RADAR SYSTEMS FOR AUTOMATICALLY INITIATING THE TRACKING OPERATION
Max Bretscher, Zurich, Switzerland, assignor to Albiswerk Zurich A.G., Zurich, Switzerland, a Swiss corporation
Filed May 18, 1960, Ser. No. 29,971
Claims priority, application, Switzerland, May 22, 1959, 73,525
2 Claims. (Cl. 343—7.3)

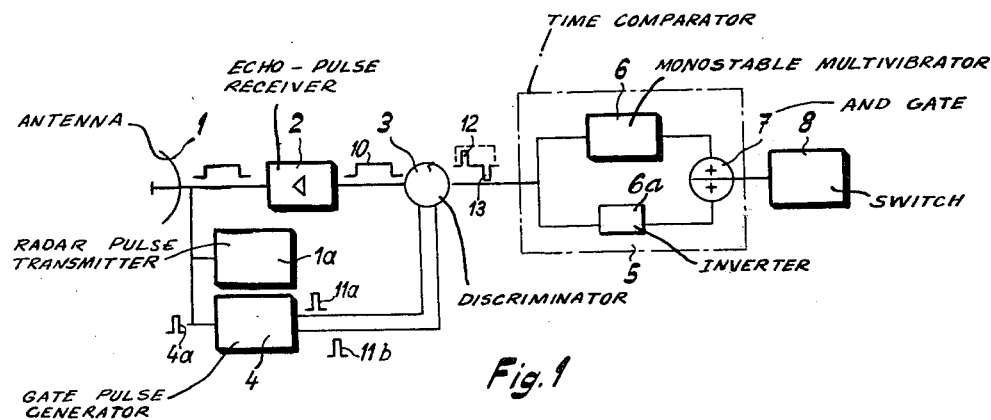
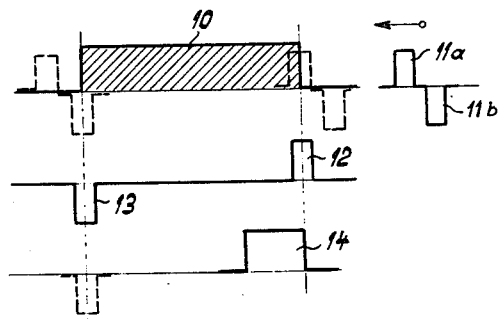
Fig. 2a
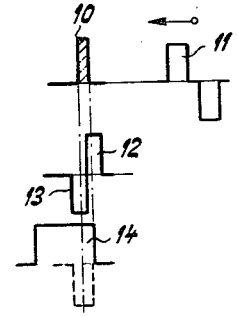
Fig. 2b

My invention relates to searching and tracking radar systems and more particularly to a device which upon locating a target during searching automatically initiates the tracking operation.

The performance of such radar systems comprises two successive stages of operation. During the searching stage, the surrounding space is periodically scanned entirely or partially as to direction and distance, for locating any targets in the space thus being searched. The portion of the space being scanned is defined by azimuth and elevation of the radar-beam axis, and the distance of any target in the space is determined by gating circuits which discriminate between different travel periods of the radar echo with the aid of a distance gate. These gating devices, consisting as a rule of gated amplifiers, pass an echo signal through the gate only if it comes from a target within a predetermined distance range. The second stage of performance serves to continuously maintain the radar beam directed upon a previously located target. That is, the radar directional beam is caused to automatically follow any motion of the target.

The transfer from "searching" to "tracking" is to be effected automatically in order to secure the desired rapidity and simplicity of attendance. Such automatic transfer, however, may be troubled by echo signals from immovable objects such as buildings or mountain ranges. There are a number of known methods for rendering such "fix echoes" ineffective. One of these methods takes advantage of the Doppler effect caused by movable targets, or moving-target indication, that is of the resulting change in frequency between the radar wave trains transmitted by the system and those received as an echo. Another method involves discriminating between the duration of different echo signals and utilizes the fact that large objects cause differences in the traveling periods of the echo signals so that for a short transmitter impulse of uniform length a prolonged echo signal is being received. This method is well suitable for moving targets, such as aircraft, whose size is small in comparison with the space being scanned.

The known methods for automatic switching from searching to tracking, however, leave much to be desired because they are apt to respond to noise signals and may cause faulty operation in cases where such noise has relatively high peaks.

It is an object of my invention to minimize such sensitivity to noise and noise peaks.

To this end, my invention is predicated on the provision of a searching and tracking radar system whose device for automatically initiating the tracking operation operates on the above-mentioned principle of discriminating between different durations of the echo signals. According to my invention, two gate pulses of constant mutual time spacing are employed in order to permit the receiver to be activated only in response to echo signals reflected from a target within a predetermined range of distances. This distance range is given by the amount of spacing between the two gate pulses, the median distance being determined by the momentary delay of the gate pulse relative to the transmitter pulse. During the searching stage, this time delay is periodically varied so that the gate pulses and echo signals temporally move relative to each other, whereas during the subsequent tracking operation the time delay is varied in follow-up relation to the movement of the target.

According to a more specific feature of my invention, I provide a radar system designed and operating as described above, with a time-comparing device which furnishes a signal for initiating the automatic target-tracking operation when the echo signal from the target coincides with the gate pulse and the interval of time elapsing from the moment when the first gate pulse and the echo pulse overlap, to the moment when only the second gate pulse and the echo signal overlap, stays below a predetermined amount of time.

The invention will be further described with reference to the embodiment of a searching and tracking radar according to the invention illustrated by way of example on the accompanying drawings, in which:

FIG. 1 is a schematic block diagram of the radar receiver including those components that perform the auomatic switching from searching to tracking;

FIGS. 2a and 2b illustrate schematically the time curves of echo signals and the pulse effects caused thereby in the receiving equipment;

Figures 3, 4:
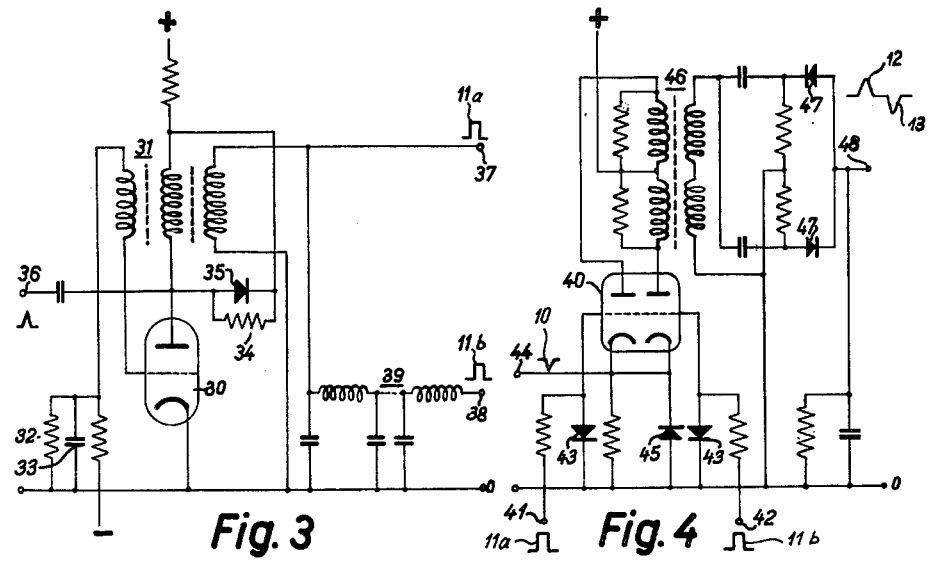
FIG. 3 is a circuit diagram of an example of a gate-pulse generator applicable in the system of FIG. 1.
FIG. 4 is a circuit diagram of a discriminator applicable in the same system.

The radar system is provided with a radar antenna 1 (FIG. 1) connected with a radar-pulse transmitter 1a and an echo-pulse receiver 2. The receiver 2 comprises high-frequency and video amplifiers. Connected to the receiver 2 is a discriminator 3 which is controlled by a time-delay network 4 operating as a gate-pulse generator. The output signal of the discriminator 3 is determined by the amplified echo signal (10) from the receiver 2, and by the gate-pulse signals (11a, 11b) from the gate-pulse generator 4. The output signals 12, 13 of the discriminator 3 are supplied to a time comparator 5 which comprises a monostable multi-vibrator 6 and an "And"-gate 7 as well as an inverter 6a. Connected to the comparator 5 is a switching device 8 which, when activated, transfers the radar system from searching to tracking.

The gate-pulse generator or time-delay line 4 is excited by the transmitter pulse 4a and, when so excited, issues, after the elapse of a given time delay, two gate pulses 11a and 11b immediately following each other. The minimum and maximum delay between the moment of the transmitter pulse and the issuance of the two gate pulses 11a, 11b correspond to the minimum travel time and the maximum travel time respectively of any echo signals that may be reflected from targets within the distance range being searched.

When during searching operation the gate pulses 11a, 11b become time displaced relative to the echo signals 10 from receiver 2, for example when the gate pulses are approaching the echo signals relative to time, a condition will be reached where the first gate pulse 11a commences to overlap the echo signals 10. When this occurs, the discriminator 3 furnishes an output signal 12 up to the moment when the second gate pulse 11b also commences to overlap the echo signals 10. The discriminator output circuit does not furnish a voltage as long as both gate pulses simultnaeously overlap the echo signals. As soon as the moment is reached when the first gate pulse 11a no longer overlaps the echo signal 10, another output signal is issued by the discriminator 3 up to the moment when the second gate pulse no longer overlaps the echo pulse.

The just-mentioned conditions are represented in the diagram of FIG. 2; the abscissa denoting pulse voltages and the ordinate denoting time. Indicated at 10 is an echo signal which, for the purpose of explanation, is assumed to be stationary; that is, the other signals still to be described are illustrated with respect to their time relation to the echo signal 10. The two gate pulses 11a and 11b, at the moment under observation, move toward the echo signal 10 as is indicated by an arrow. When the first gate pulse 11a commences to overlap the echo pulse 10, the discriminator 3 issues a resulting output signal 12. An analogous signal 13 of the opposite polarity is issued by the discriminator 3 when only the second gate pulse 11b overlaps the echo signal 10. Consequently, the time elapsing between the discriminator output signals 12 and 13 is a measure for the duration of the echo signals.

In the time comparator 5, the discriminator output signal 12 releases the monostable multivibrator 6. The multivibrator pulse 14 thus produced is supplied to the "And"-gate 7 simultaneously with the discriminator output pulse 13. The gate 7 produces a switching signal only when the pulse 13 coincides in time with the multivibrator pulse 14, then releasing the switching device 8. The maximum duration of an echo signal suitable for initiating automatic target tracking, is therefore given by the duration of the multivibrator pulse 14 and the speed at which the gate pulses 11a, 11b are time-displaced relative to the echo signals 10.

In FIG. 2a, the echo signals 10 are too long to produce a switching from searching to tracking so that the searching operation continues. In the diagram of FIG. 2b, the echo signals 10 are sufficiently short to effect a transfer. The discriminator output pulses 12 and 13 follow directly upon each other and the gate 7 releases the switching device 8. The "And"-gate 7 may comprise a cold-cathode tube with two control grids in whose anode circuit a relay is connected to serve as a switching device, this being more fully described hereinafter with reference to FIG. 5.

Since in the device according to the invention a time coincidence of pulses is utilized as a criterion for the initiation of the automatic tracking operation, the device is relatively insensitive to noise peaks and in this respect superior to those heretofore available. Known devices for automatic switching involve the use of discriminators responsive to certain threshold values and hence are more sensitive to noise and noise peaks.

While the individual components or subassemblies of a radar system according to the invention as hereinbefore described are known as such, a description of the essential components will now be given for the purpose of exemplification.

Figure 5:
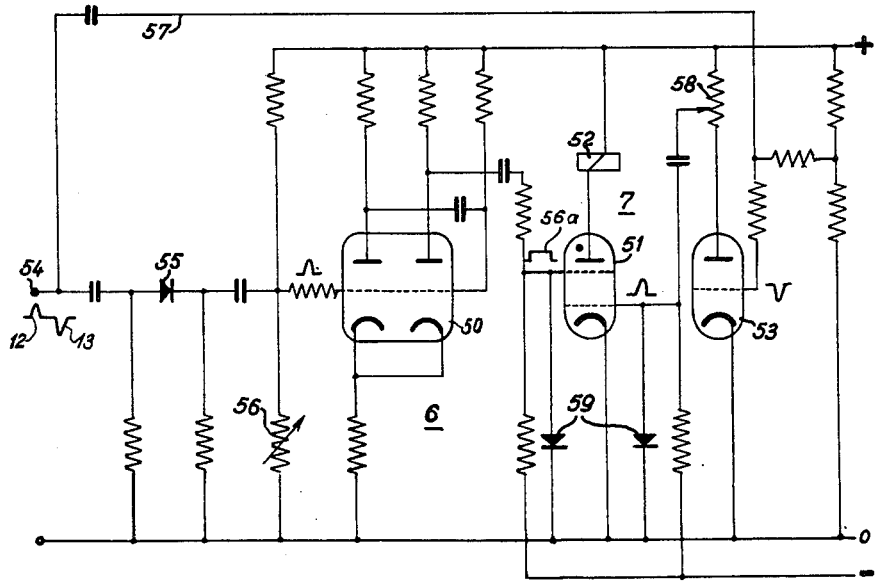
FIG. 5 is a circuit diagram of a comparator with a gated amplifier and a switching relay suitable for the same system.

Shown in FIG. 3 is the circuit diagram of the time-de-'ay line 4 operating as a gate-pulse generator. A blocking oscillator is used for producing the first gate pulse 11a. This blocking oscillator comprises an electronic tube 30, a transformer 31, an RC member 32, 33 and a limiter diode 35 shunted by a resistor 34. In FIGS. 3 to 5 the rectangular symbols, like the one designated by 34, denote ohmic resistors. The operation of such a blocking oscillator is known as such, for example, from the book by Chance, Hulsizer, MacNichol and Williams "Electronic Time Measurements," MIT Radiation Laboratory Series No. 20, pages 78 and 79. A synchronizing pulse is supplied to the anode of tube 30. This synchronizing pulse is supplied to an input terminal 36 and is derived from the phase displacer of a distance measuring device. The first gate pulse 11a occurs at an output terminal 37. The second gate pulse 11b, appearing at an output terminal 38, is derived from the first gate pulse through a delay line 39 consisting of reactance coils and capacitors, as shown. The two gate pulses 11a, 11b are each of 0.5 microseconds duration and are closely spaced from each other.

The circuit diagram of the discriminator 3 (FIG. 1) is illustrated in FIG. 4. The design and operation of such a discriminator are known as such, for example, from pages 314 to 316 and FIG. 8-32 in the above-mentioned textbook. The discriminator tube 40 is controlled at its two grids by the respective gate pulses. The first gate pulse 11a is supplied from terminal 37 in FIG. 3 to the input terminal 41 (FIG. 4) of the discriminator. The second gate pulse 11b is supplied from terminal 38 in FIG. 3 to the second input terminal 42 (FIG. 4) of the discriminator. Two diodes 43 are used for voltage limitation. The echo or video signal passes through an input terminal 44 to the two interconnected cathodes of the discriminator tube 40. Another limiting diode is shown at 45. The secondary circuit of a differential transformer 46 connected in the plate circuit of the twin tube comprises two discriminator diodes 47. During the duration of the first gate pulse 11a, a positive video-signal current passes through the output terminal 48. During the second gate pulse 11b a negative video-signal current passes through the terminal 48. The time spacing between the voltage pulses 12 and 13, corresponding to the two respective video-signal currents, is a measure for the duration of the echo or video signals composed of numerous successive individual echoes.

According to FIG. 5, the comparator 5 (FIG. 1) comprises a twin tube 50 which forms part of a monostable multivibrator (6 in FIG. 1). The "And"-gate 7 in FIG. 1 is constituted in FIG. 5 by a thyratron 51 which comprises a relay 52 in its anode circuit. This relay serves for releasing the transfer device (8 in FIG. 1). Another tube 53 is used for amplification and phase reversal. The signals 12, 13 taken from the output terminal 48 (FIG. 4) of the discriminator are supplied to the input terminal 54 of the comparator. The first, positive signal 12 passes through a diode to the first control grid of the tube 50 and releases the multivibrator. By means of a variable resistor 56, the response level of the multivibrator can be adjusted. The output circuit of the multivibrator furnishes a pulse 56a of constant duration and constant amplitude which is imposed upon the anode-adjacent control grid of the thyratron 51. The input signals 12, 13 also pass from terminal 54 through a lead 57 to the tube 53. However, the grid of tube 53 has a voltage bias of such magnitude that only the second, negative signal is active in tube 53. A positive pulse is then produced in the plate circuit of tube 53. This positive pulse is imposed upon the cathode-adjacent control grid of the thyratron 51. The amplitude of the positive pulse is adjustable by means of a variable resistor 58. Two diodes 59 are provided for control-limiting purposes.

The thyratron 51 is ignited only when both control grids are simultaneously biased by positive signals. The multivibrator pulse 56a released by the first, positive discriminator signal 12 prepares, during its duration, the tube 51 for subsequent ignition. The second, negative discriminator signal 13 then ignites the thyratron 51, provided the multivibrator pulse 56a is not yet terminated at this moment so that the tube is still in ready condition. Consequently, the tube 51 can ignite and can operate the switching relay 52 only when the time spacing of the discriminator signals is shorter than the duration of the multivibrator pulse. The predetermined duration of the multivibrator pulse therefore determines the longest duration of the echo signals up to which a release of the transfer switching device is to be effected. Relay 52 closes a contact switch (not shown) which puts the tracking system into operation, thus transferring the radar system from searching to tracking.

It will be understood by those skilled in the art, upon a study of this disclosure, that my invention permits of a variety of modifications with respect to the individual components of the radar system and the searching-to-tracking switch, and hence may be embodied in equipment other than particularly illustrated and described herein, without departing from the essential features of my invention and within the scope of the claims annexed hereto.

I claim:
1. Device for automatically switching from searching to target-tracking operation in radar systems, comprising a radar transmitter and receiver to provide radar echo signals from a target, a gate-pulse generator connected to said transmitter and having an output of two gating pulses of constant mutual time spacing and of periodically variable delay relative to the echo-producing transmitter pulses, discriminator means connected to said receiver and said gate pulse generator for furnishing a gating pulse upon coincidence of the respective time edges of said echo signal with respective gating pulses, time comparator means having a coincidence gate and connected to said discriminator means for issuing a switching signal only when the interval between coincidence pulses remains below a given time limit, and transfer relay means connected to said coincidence gate for automatically switching from searching to tracking in response to occurrence of said switching signal.

2. Device for automatically switching from searching to target-tracking operation in radar systems, comprising a radar transmitter and receiver to provide radar echo signals from a target, a gate-pulse generator connected to the transmitter having an output of two gating pulses of constant mutual time spacing and periodically variable delay relative to the echo-producing transmitter pulses, discriminator means having two input circuits and an output circuit of which said input circuits are connected for response to said echo signals and said gate pulses respectively for furnishing positive and negative discriminator pulses whose mutual time spacing is indicative of the length of the echo signals, a monostable multivibrator connected to said discriminator means to be released by the first one of said two discriminator pulses to issue a multivibrator pulse, a coincidence gate connected to said multivibrator and to said discriminator means and having a gate-output circuit to provide a switching pulse when the second of said discriminator pulses coincides with the multivibrator pulse, and transfer relay means connected to said coincidence gate for automatically switching from searching to tracking in response to occurrence of said switching pulse.

References Cited by the Examiner
UNITED STATES PATENTS

| | | | |
|---|---|---|---|
| 2,905,887 | 9/59 | Taddeo | 343—7.3 |
| 2,915,747 | 12/59 | Segerstrom | 343—7.3 |
| 2,940,073 | 6/60 | Sprangen et al. | 343—7.3 |
| 2,975,299 | 3/61 | Mintzer | 343—7.3 |
| 2,975,366 | 3/61 | Young | 328—111 |
| 2,989,652 | 6/61 | Hall | 343—7.3 |

CHESTER L. JUSTUS, *Primary Examiner.*